US008414012B2

(12) United States Patent
Chen et al.

(10) Patent No.: US 8,414,012 B2
(45) Date of Patent: Apr. 9, 2013

(54) STROLLER CONNECTABLE WITH A CAR SEAT

(75) Inventors: Shun-Min Chen, Taipei (TW); Xiao-Hong Xiao, Hong Kong (CN)

(73) Assignee: Wonderland Nurserygoods Company Limited, Central Hong Kong (HK)

( * ) Notice: Subject to any disclaimer, the term of this patent is extended or adjusted under 35 U.S.C. 154(b) by 138 days.

(21) Appl. No.: 12/955,070

(22) Filed: Nov. 29, 2010

(65) Prior Publication Data
US 2011/0175305 A1    Jul. 21, 2011

(30) Foreign Application Priority Data

Dec. 1, 2009  (CN) .......................... 2009 1 0246080

(51) Int. Cl.
*B62B 3/02* (2006.01)
*B62B 7/08* (2006.01)
*B62B 7/14* (2006.01)
*B62B 9/28* (2006.01)

(52) U.S. Cl. ........ 280/648; 280/643; 280/650; 280/658; 280/47.4

(58) Field of Classification Search .................... 280/30, 280/642, 643, 647, 648, 649, 650, 658, 47.25, 280/47.38, 47.4, 47.41
See application file for complete search history.

(56) References Cited

U.S. PATENT DOCUMENTS

| | | | |
|---|---|---|---|
| 4,173,355 A | 11/1979 | Perego | |
| 4,762,331 A * | 8/1988 | Tucker et al. | 280/30 |
| 4,768,795 A * | 9/1988 | Mar | 280/30 |
| 5,022,669 A * | 6/1991 | Johnson | 280/30 |
| 5,056,805 A * | 10/1991 | Wang | 280/47.36 |
| 5,240,265 A * | 8/1993 | Huang | 280/47.4 |
| 5,499,831 A * | 3/1996 | Worth et al. | 280/30 |
| 5,516,142 A * | 5/1996 | Hartan | 280/642 |
| 5,772,279 A * | 6/1998 | Johnson, Jr. | 297/130 |
| 5,833,261 A | 11/1998 | Brown et al. | |
| 6,070,890 A * | 6/2000 | Haut et al. | 280/47.38 |
| 6,099,022 A * | 8/2000 | Pring | 280/648 |
| 6,241,274 B1 * | 6/2001 | Huang | 280/642 |
| 6,322,098 B1 * | 11/2001 | Lan | 280/642 |
| 6,331,032 B1 * | 12/2001 | Haut et al. | 297/130 |
| 6,398,233 B1 * | 6/2002 | Liang et al. | 280/30 |
| 6,409,205 B1 * | 6/2002 | Bapst et al. | 280/642 |
| 6,565,111 B2 * | 5/2003 | Ageneau | 280/647 |
| 6,612,645 B1 * | 9/2003 | Hsu | 297/195.13 |
| 6,626,452 B2 * | 9/2003 | Yang et al. | 280/643 |
| 6,702,316 B2 * | 3/2004 | Hsia | 280/648 |
| 6,802,514 B2 * | 10/2004 | Worth et al. | 280/30 |
| 6,869,096 B2 * | 3/2005 | Allen et al. | 280/642 |
| 6,910,708 B2 * | 6/2005 | Sack et al. | 280/642 |
| 7,040,694 B2 * | 5/2006 | Sedlack | 297/130 |
| 7,070,197 B2 * | 7/2006 | Chen | 280/642 |

(Continued)

*Primary Examiner* — J. Allen Shriver, II
*Assistant Examiner* — Andrew Khouzam
(74) *Attorney, Agent, or Firm* — Frommer Lawrence & Haug LLP; Ronald R Santucci (57) ABSTRACT

A stroller is adapted to be connected with a car seat, and includes a frame, a footrest, and at least one locking device. The frame has two seat rods. The footrest is disposed between the seat rods, and includes two side rod sections and a middle rod section having two ends connected respectively and pivotally to the side rod sections. The locking device is disposed between one of the side rod sections and a corresponding one of the seat rods, and includes an angle-limiting mechanism and an actuator operable to cooperate with the angle-limiting mechanism so as to adjust the footrest among a plurality of angular positions including an erected position whereat the stroller is connectable with the car seat.

22 Claims, 13 Drawing Sheets

U.S. PATENT DOCUMENTS

| | | | |
|---|---|---|---|
| 7,114,743 B2 * | 10/2006 | Kassai et al. | 280/650 |
| 7,278,652 B2 * | 10/2007 | Riedl et al. | 280/642 |
| 7,354,049 B2 * | 4/2008 | Schmidt | 280/33.993 |
| 7,367,580 B2 * | 5/2008 | Iwata et al. | 280/642 |
| 7,401,803 B1 * | 7/2008 | Lai | 280/647 |
| 7,445,229 B2 * | 11/2008 | Dotsey et al. | 280/642 |
| 7,464,957 B2 * | 12/2008 | Worth et al. | 280/642 |
| 7,490,848 B2 * | 2/2009 | Wu et al. | 280/657 |
| 7,513,512 B2 * | 4/2009 | Yoshie et al. | 280/47.38 |
| 7,543,886 B2 * | 6/2009 | Gutierrez-Hedges et al. | 297/118 |
| 7,600,775 B2 * | 10/2009 | Chen et al. | 280/650 |
| 7,614,640 B2 * | 11/2009 | Dean et al. | 280/642 |
| 7,686,322 B2 * | 3/2010 | Longenecker et al. | 280/642 |
| 7,753,397 B2 * | 7/2010 | Yang | 280/642 |
| 7,775,532 B2 * | 8/2010 | Chen et al. | 280/47.4 |
| 7,780,183 B2 * | 8/2010 | Chen et al. | 280/647 |
| 7,798,500 B2 * | 9/2010 | Den Boer | 280/47.34 |
| 8,100,429 B2 * | 1/2012 | Longenecker et al. | 280/642 |
| 8,201,846 B2 * | 6/2012 | Yu et al. | 280/650 |
| 2003/0094791 A1 * | 5/2003 | Hartenstine et al. | 280/642 |
| 2004/0124611 A1 * | 7/2004 | Gong et al. | 280/642 |
| 2004/0178593 A1 * | 9/2004 | Szmidt et al. | 280/47.38 |
| 2005/0127640 A1 * | 6/2005 | Worth et al. | 280/642 |
| 2005/0161913 A1 * | 7/2005 | Suga et al. | 280/647 |
| 2006/0131841 A1 * | 6/2006 | Huang | 280/647 |
| 2008/0073879 A1 * | 3/2008 | Chen et al. | 280/642 |
| 2008/0079240 A1 * | 4/2008 | Yeh | 280/642 |
| 2008/0129001 A1 * | 6/2008 | Emerson | 280/30 |
| 2009/0121454 A1 * | 5/2009 | Tomasi et al. | 280/642 |
| 2009/0127826 A1 * | 5/2009 | Tomasi et al. | 280/642 |
| 2010/0019547 A1 * | 1/2010 | Gray et al. | 297/118 |
| 2010/0078916 A1 * | 4/2010 | Chen | 280/648 |
| 2010/0171289 A1 * | 7/2010 | Greger et al. | 280/648 |
| 2010/0230933 A1 * | 9/2010 | Dean et al. | 280/647 |
| 2012/0032419 A1 * | 2/2012 | Li | 280/647 |
| 2012/0086188 A1 * | 4/2012 | Conrad et al. | 280/647 |

* cited by examiner

STROLLER CONNECTABLE WITH A CAR SEAT

CROSS-REFERENCE TO RELATED APPLICATION

This application claims priority of Chinese Patent Application No. 200910246080.8, filed on Dec. 1, 2009, the disclosure of which is incorporated herein by reference.

BACKGROUND OF THE INVENTION

1. Field of the Invention

This invention relates to a stroller, and more particularly to a stroller having an adjustable footrest and connectable with a car seat.

2. Description of the Related Art

Strollers having adjustable footrests are available. For example, a footrest disclosed in U.S. Pat. No. 5,833,261 is pivotable on armrests between two positions for different uses of the child occupant. Another footrest is disclosed in U.S. Pat. No. 4,173,355, and is adjustable to reduce the width of the stroller when the stroller is folded.

In addition, strollers connectable with car seats are also available. Such a stroller, however, is limited to be of full size.

SUMMARY OF THE INVENTION

An object of this invention is to provide a stroller with a footrest that can be adjustable among different positions so that the child occupant can lie on or sit upright on the stroller and so as to connect with a car seat.

Accordingly, a stroller of this invention is adapted to be connected with a car seat, and includes a frame, a footrest, and at least one locking device. The frame has two seat rods. The footrest is disposed between the seat rods, and includes two side rod sections and a middle rod section having two ends connected respectively and pivotally to the side rod sections. The locking device is disposed between one of the side rod sections and a corresponding one of the seat rods, and includes an angle-limiting mechanism and an actuator operable to cooperate with the angle-limiting mechanism so as to adjust the footrest among a plurality of angular positions including an erected position whereat the stroller is connectable with the car seat.

When the stroller is an umbrella stroller, through operation of the locking device, the footrest can be adjusted among the angular positions for different uses of the child occupant and for connection with the car seat. Furthermore, in a case where the stroller is foldable, when the stroller is folded, the side rod sections are pivoted relative to the middle rod section such that the width of the stroller can be reduced.

BRIEF DESCRIPTION OF THE DRAWINGS

These and other features and advantages of this invention will become apparent in the following detailed description of a preferred embodiment of this invention, with reference to the accompanying drawing, in which.

DETAILED DESCRIPTION OF THE PREFERRED EMBODIMENT

Referring to FIGS. 1 to 4, the preferred embodiment of a stroller 1 according to this invention includes a frame 10, a footrest 2, and two locking devices 3. The frame 10 includes two front leg rods 112, two rear leg rods 122, two push rods 132, two seat rods 5, a scissor-linkage 14 disposed between the front leg rods 112 and the rear leg rods 122, a pair of front wheels 15, and a pair of rear wheels 16. The frame 10 has two opposite sides each including one of the front leg rods 112, one of the rear leg rods 122, and one of the push rods 132, one of the seat rods 5.

Figure 1:
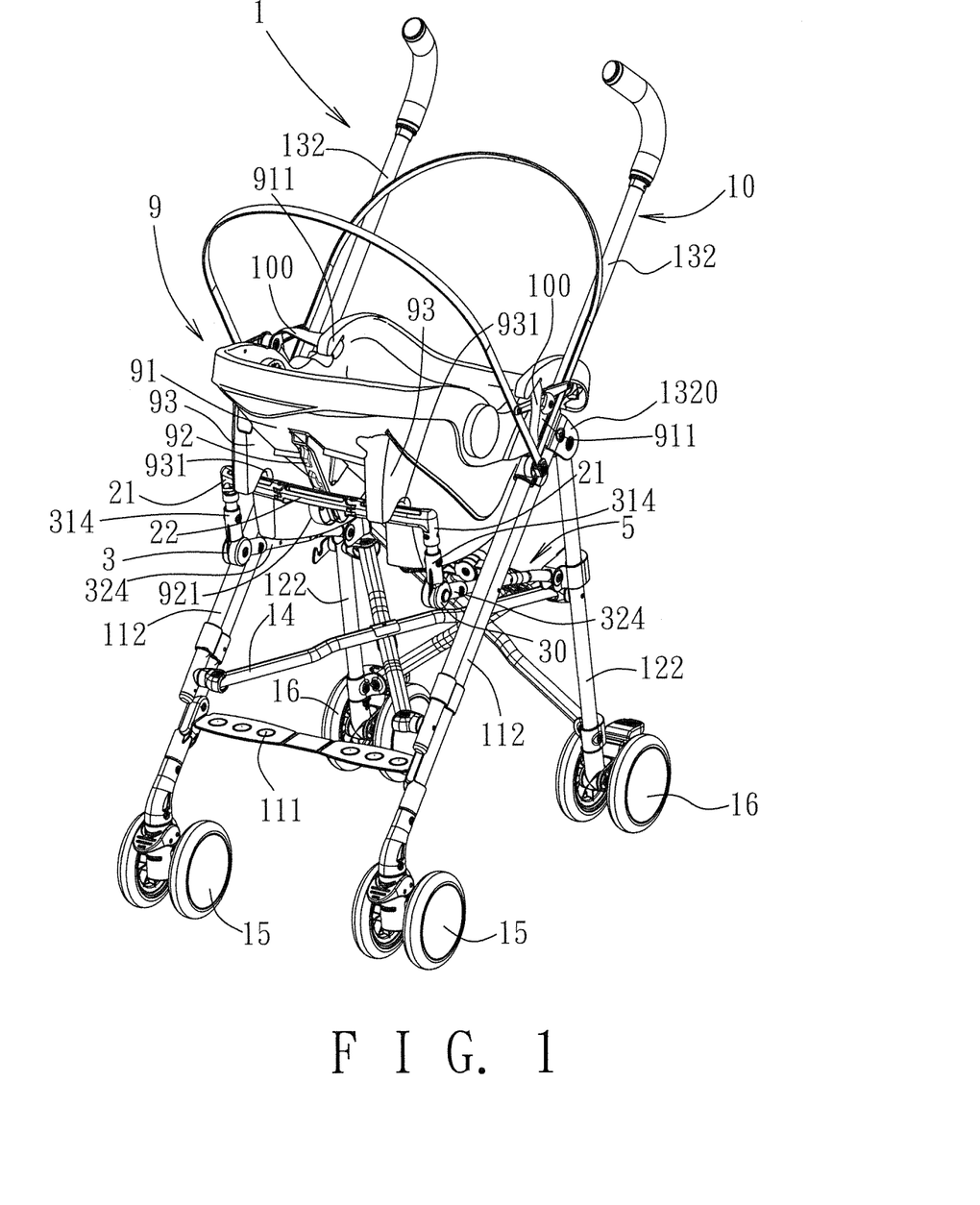
FIG. 1 is a perspective view of the preferred embodiment of a stroller according to this invention when a footrest is disposed at a first angular position and when the stroller is connected with a car seat.
Figure 4:
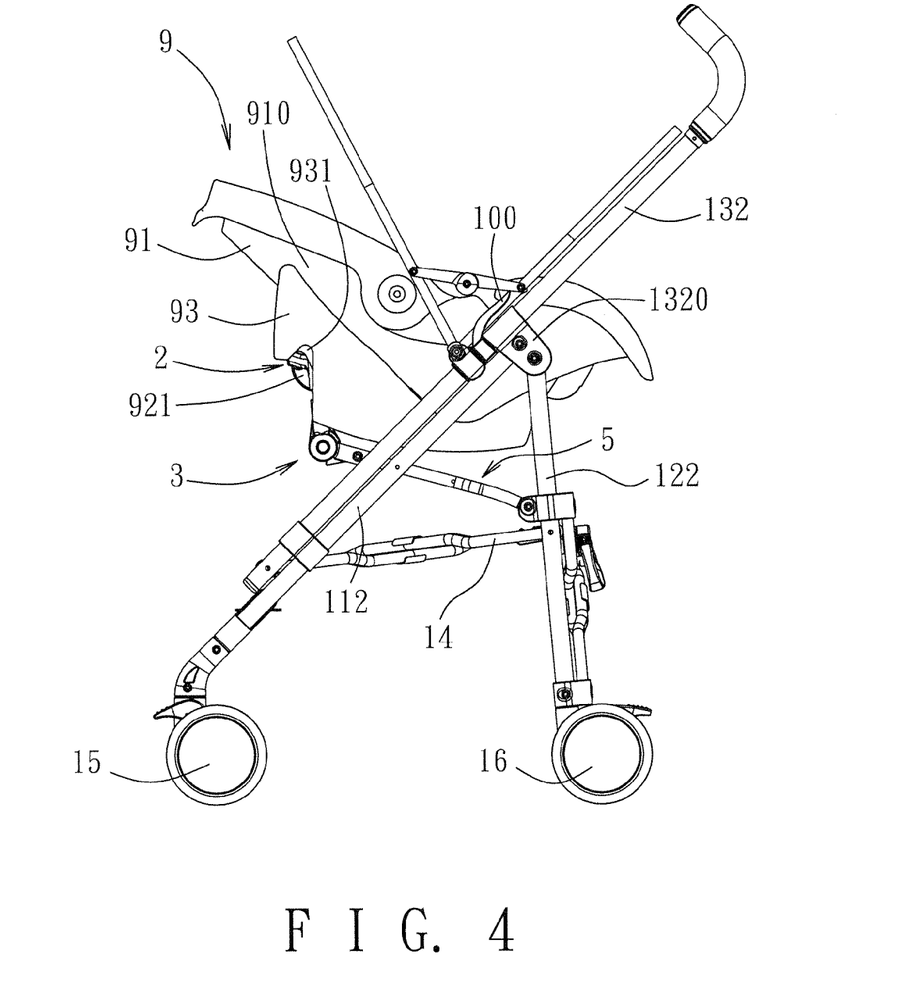
FIG. 4 is a side view of the preferred embodiment and the car seat when the footrest is disposed at the first angular position.

With particular reference to FIGS. 1 and 4, the stroller 1 is usable with a car seat 9. In this embodiment, the stroller 1 is an umbrella stroller. The car seat 9 includes a seat body 91 permitting a child occupant to be seated thereon. The seat body 91 has a bottom surface formed with a middle ridge wall 92 and two side ridge walls 93 flanking the middle ridge walls 92. The middle ridge wall 92 is provided with a retaining portion 921 configured as a hook for engaging the footrest 2. Each of the side ridge walls 93 has a concaved portion 931 corresponding to the retaining portion 921.

Figure 2:
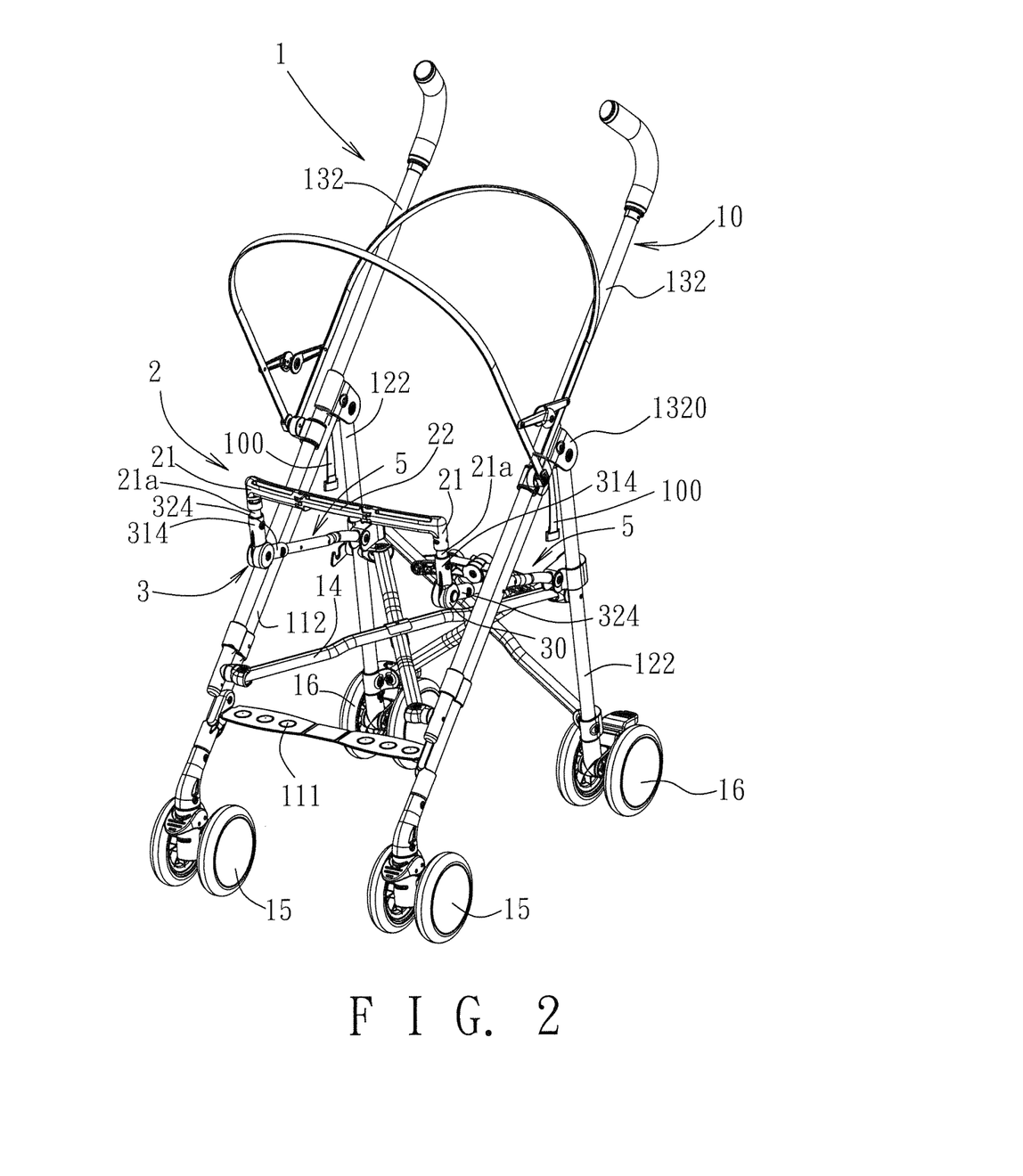
FIG. 2 is a view similar to FIG. 1 but not showing the car seat.

With particular reference to FIG. 2, a footrest plate 111 is connected between the front leg rods 112. The front wheels 15 are disposed respectively on bottom ends of the two front leg rods 112. The rear wheels 16 are disposed respectively on bottom ends of the two rear leg rods 122. Bottom ends of the two push rods 132 are connected respectively to the front leg rods 112. A top end of each of the rear leg rods 122 is pivotally connected to a pivot support frame 1320 of the corresponding front leg rod 112. The scissor-linkage 14 has an upper end connected pivotally to the two rear leg rods 122, and a lower end connected pivotally to the two push rods 132, so that the stroller is easy to fold.

Figure 10:
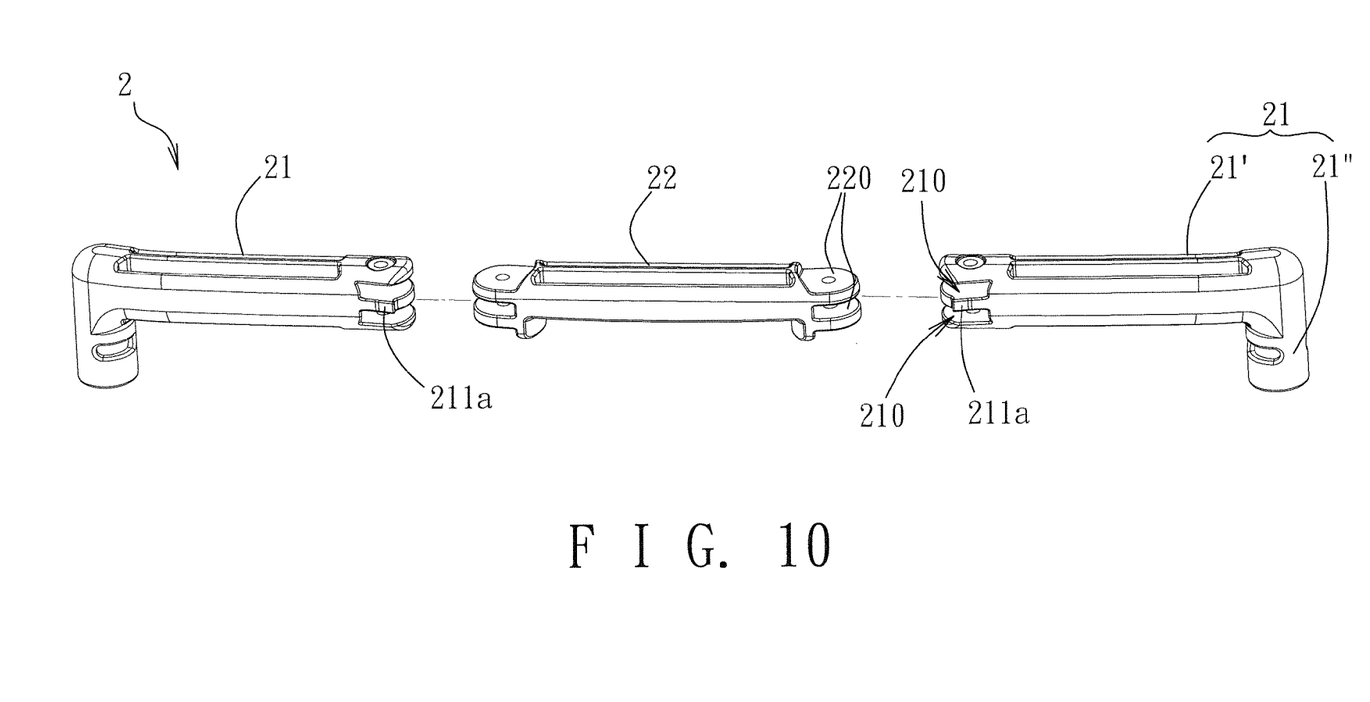
FIG. 10 is an exploded perspective view of the footrest of the preferred embodiment.

The footrest 2 is disposed pivotally between front ends of the two seat rods 5. In this embodiment, the footrest 2 includes two side rod sections 21 and a middle rod section 22 having two ends connected respectively and pivotally to ends of the side rod sections 21. Each of the side rod sections 21 of the footrest 2 is connected to the corresponding seat rods 5 by the corresponding locking device 3. The locking devices 3 are operable to allow for angle adjustment of the footrest 2 relative to the seat rods 5. With further reference to FIG. 10, each of the side rod sections 21 of the footrest 2 is L-shaped, and has a longitudinal portion 21' connected pivotally to the middle rod section 22 at an end thereof by a connecting unit, and a transverse portion 21" extending perpendicularly from an opposite end of the longitudinal portion 21'. Each of the connecting units includes two receiving spaces 210 formed in the corresponding side rod section 21, two lugs 220 formed on the middle rod section 22 and inserted respectively into the receiving spaces 210, and a pivot pin (not shown) extending through the receiving spaces 210 and the lugs 220.

Figure 6:
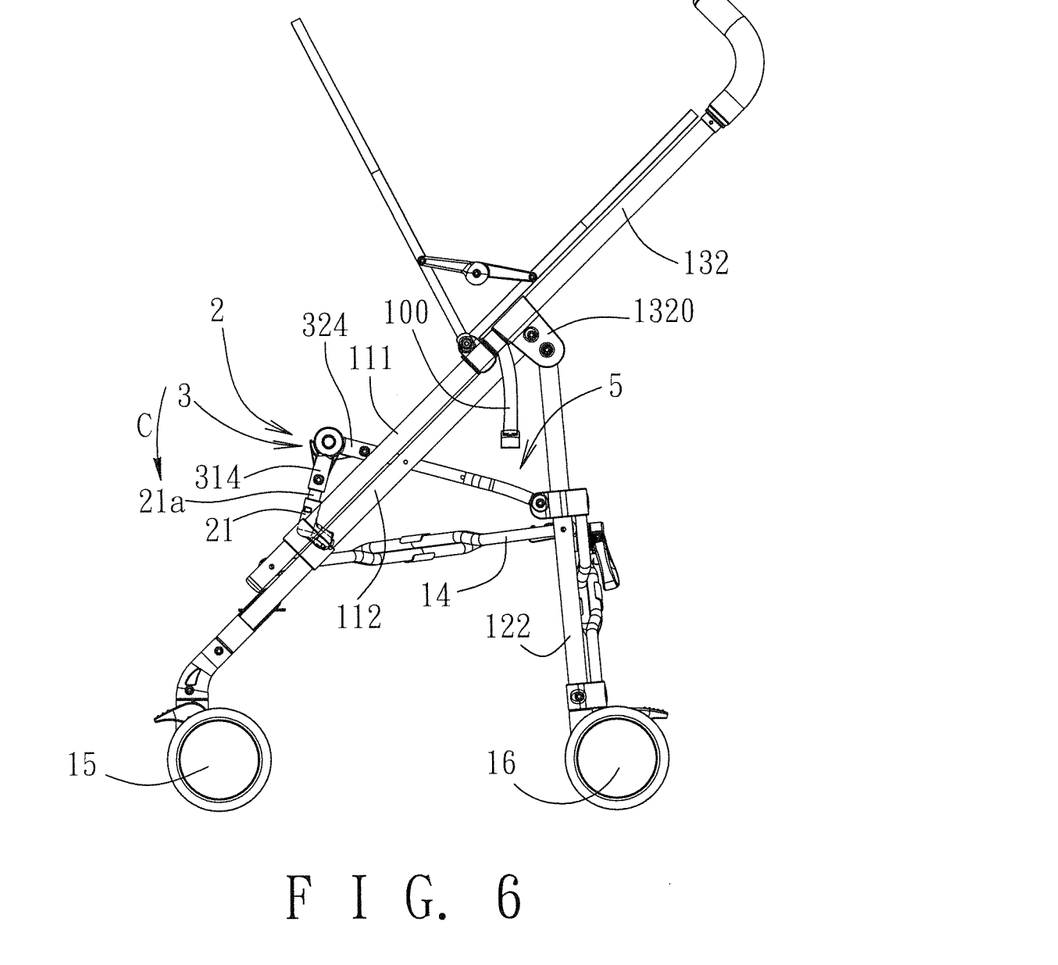
FIG. 6 is a view similar to FIG. 3 but illustrating the footrest at a third angular position.
Figure 7:
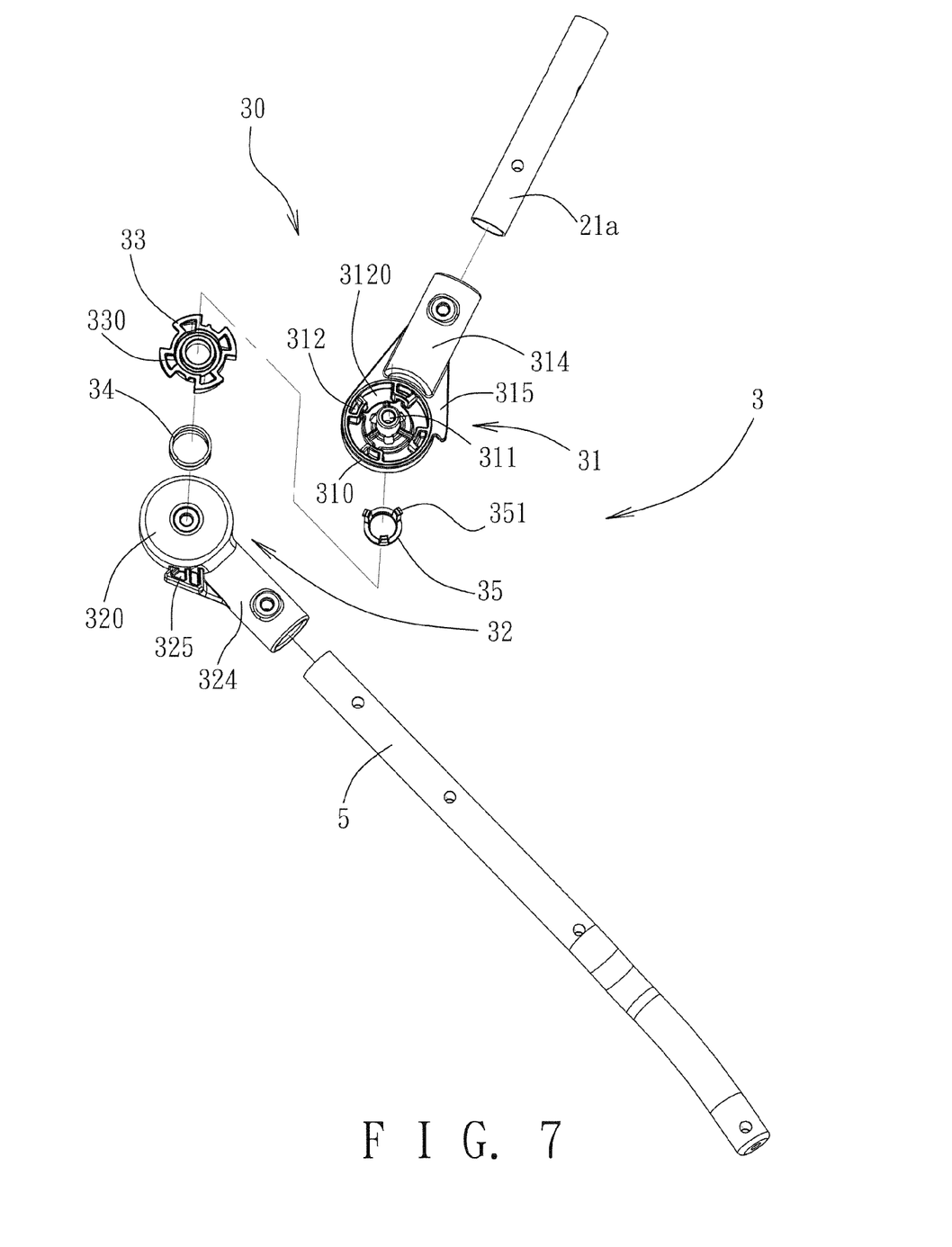
FIG. 7 is a fragmentary exploded perspective view of the preferred embodiment, illustrating a locking device.
Figure 8:
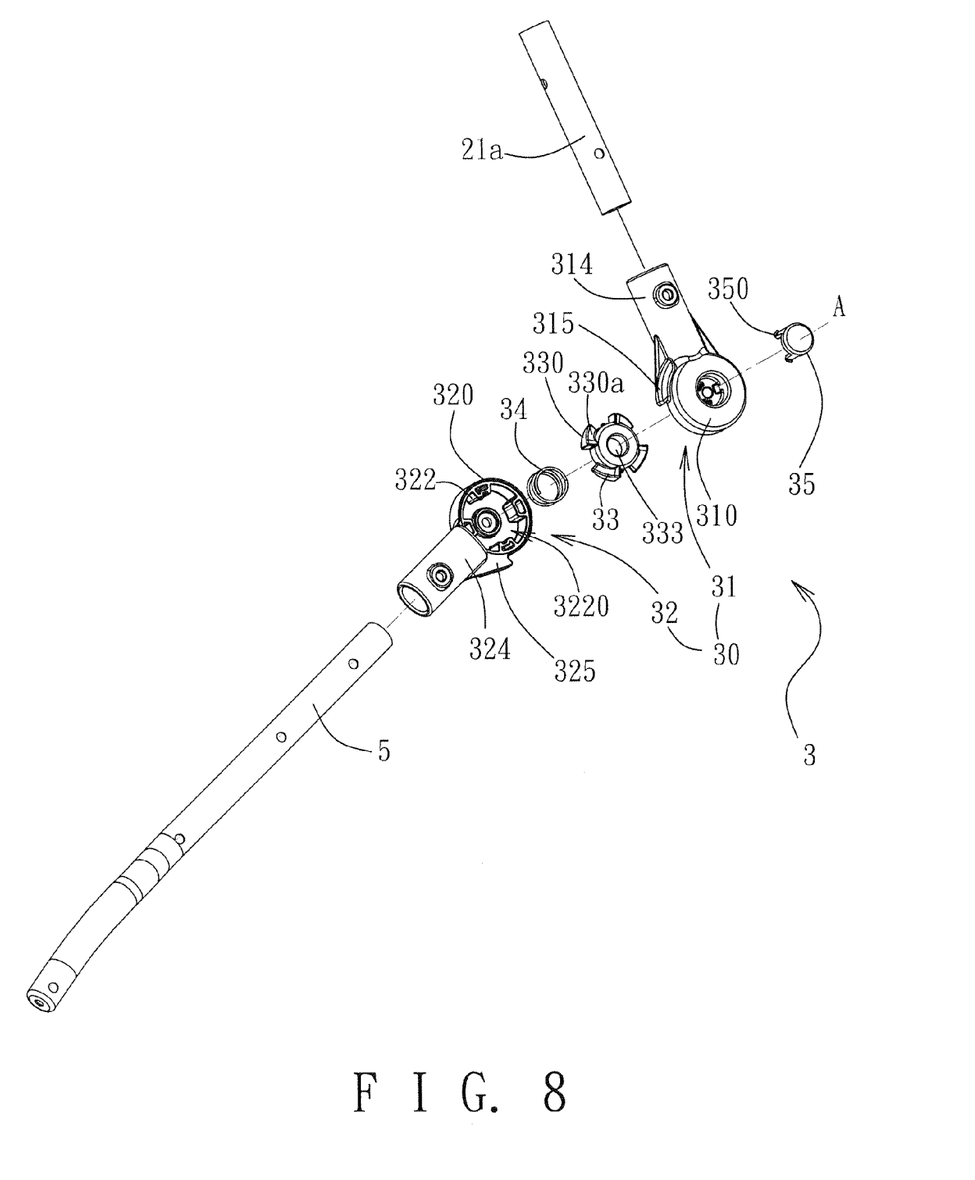
FIG. 8 is a fragmentary exploded perspective view of the preferred embodiment, viewed at another angle.

With further reference to FIGS. 7 and 8, each of the locking devices 3 includes an angle-limiting mechanism 30, and an actuator 35 connected to the angle-limiting mechanism 30. Through operation of the actuator 35, the footrest 2 can be pivoted relative to the seat rods 5 among a first angular position shown in FIGS. 3 and 4, a second angular position shown in FIG. 5, and a third angular position shown in FIG. 6. One of the locking devices 3 will be described in the succeeding paragraphs.

The angle-limiting mechanism 30 includes a first pivot member 31, a second pivot member 32 connected pivotally to the first pivot member 31 such that the first and second pivot members 31, 32 are pivotable about an axis (A) (see FIG. 8), a positioning member 33 disposed between the first and second pivot members 31, 32 for locking the first and second pivot members 31, 32 relative to each other when the footrest 2 is disposed at any one of the first, second, and third angular positions, and a spring 34 for biasing the positioning member 33 to maintain the footrest 2 in a locked state. The actuator 35 is disposed at an axial end of the angle-limiting mechanism 30. The positioning member 33 is biased by the spring 34 to contact the actuator 35 such that the actuator 35 is operable to apply an axial force to the spring 34 for releasing the first and second pivot members 31, 32 from each other.

With particular reference to FIG. 7, the first pivot members 31 includes a first cylindrical housing 310, a pivot shaft 311 extending from the first cylindrical housing 310 toward the second pivot member 32, and a plurality of projections 312 formed on the first cylindrical housing 310 and arranged circumferentially on the first cylindrical housing 310. Any two adjacent ones of the projections 312 define a first engaging groove 3120 therebetween. The first pivot member 31 further includes a first mounting sleeve 314 extending integrally, radially and outwardly from the first cylindrical housing 310, and an engaging tube 21a extending into and connected fixedly to the first mounting sleeve 314 at one end thereof and connected fixedly to the corresponding side rod sections 21 of the footrest 2 at the other end thereof.

With particular reference to FIG. 8, the second pivot members 32 includes a second cylindrical housing 320, and a plurality of projections 322 formed on the second cylindrical housing 320 and arranged circumferentially of the second cylindrical housing 320. Any two adjacent ones of the projections 322 define a second engaging groove 3220 therebetween. The second pivot member 32 further includes a second mounting sleeve 324 extending integrally, radially and outwardly from the second cylindrical housing 320. A front end of the corresponding seat rod 5 is fixed within the second mounting sleeve 324.

Figure 9:
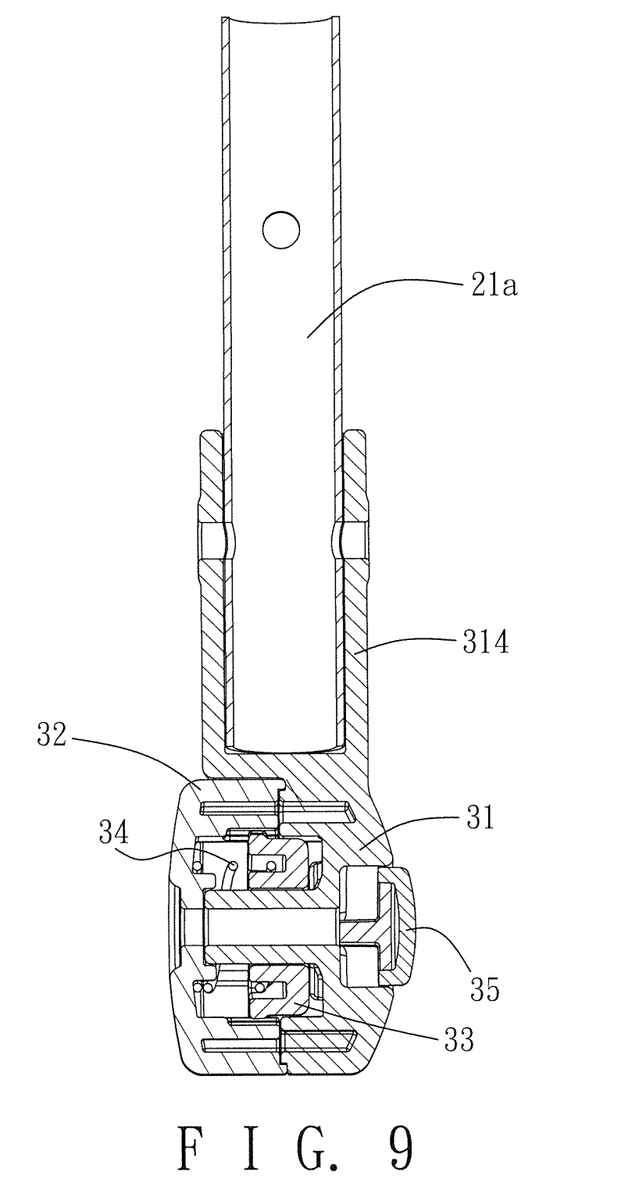
FIG. 9 is a fragmentary sectional view of the preferred embodiment, illustrating the locking device.

With further reference to FIG. 9, the positioning member 33 is configured as a gear, and has a plurality of teeth 330 each engaging the corresponding first engaging groove 3120 in the first pivot member 31 and the corresponding second engaging groove 3220 in the second pivot member 32 to lock the first and second pivot members 31, 32 relative to each other. The positioning member 33 further has a through hole 333, and thus can be sleeved on the pivot shaft 311.

The spring 34 is sleeved on the pivot shaft 311, and is disposed between the second pivot member 32 and the positioning member 33 for biasing the positioning member 33 toward the first pivot member 31 so as to allow the teeth 330 to engage the first and second engaging grooves 3120, 3220, thereby maintaining the footrest 2 in the locked state.

With particular reference to FIG. 8, each of the teeth 330 of the positioning member 33 has an inclined side surface 330a facing the first pivot member 31 such that, when the footrest 2 is pivoted upwardly relative to the seat rods 5, the projections 312 of the first pivot member 31 come into slidable contact with the inclined side surfaces 330a of the teeth 330 to push the positioning member 33 toward the second pivot member 32 against the biasing action of the spring 34 to thereby release the first and second pivot members 31, 32 from each other. As such, the footrest 2 can be pivoted upwardly relative to the seat rods 5 without operation of the actuator 35. A stop structure (not shown) is provided between the first cylindrical housing 310 and the positioning member 33 to limit the rotational angle of the footrest 2 within a predetermined range.

Figure 3:
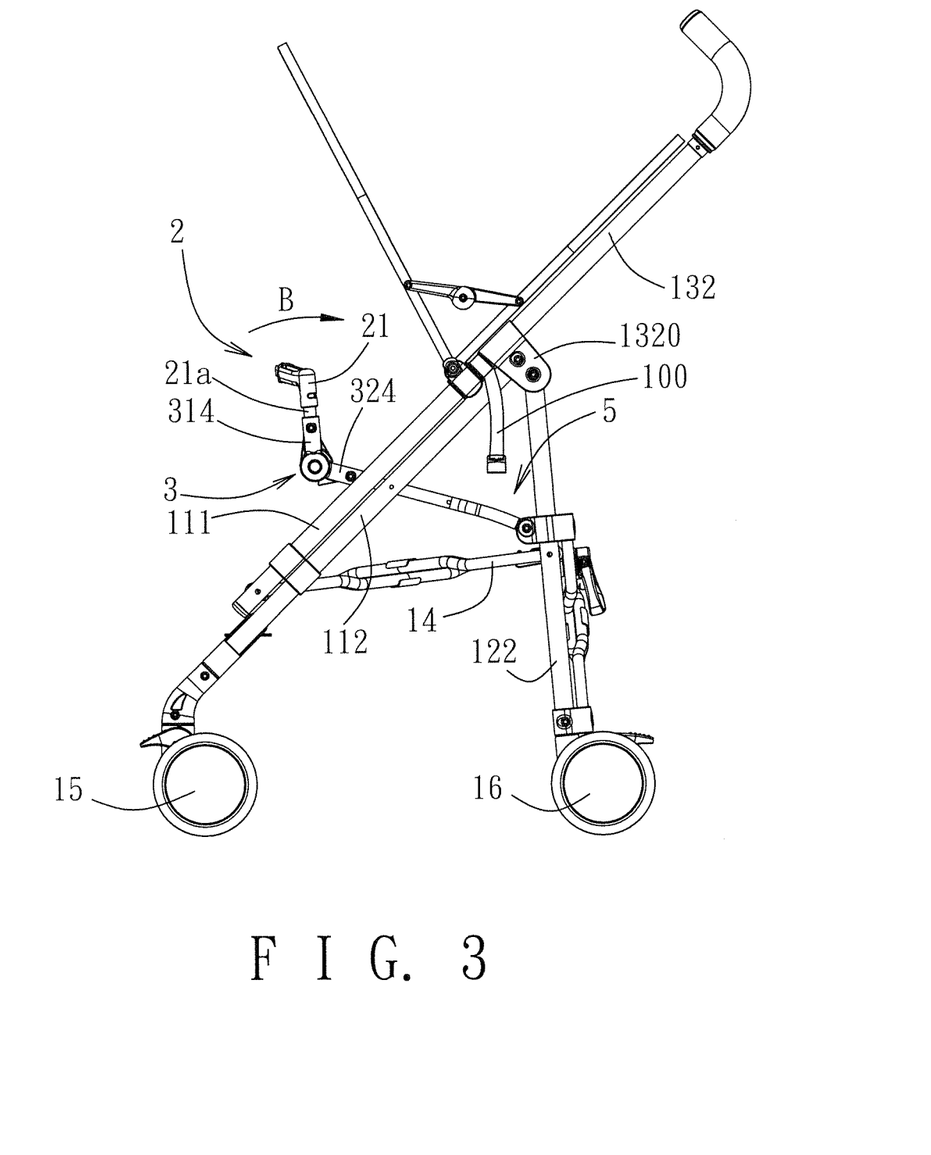
FIG. 3 is a side view of the preferred embodiment when the footrest is disposed at the first angular position.
Figure 5:
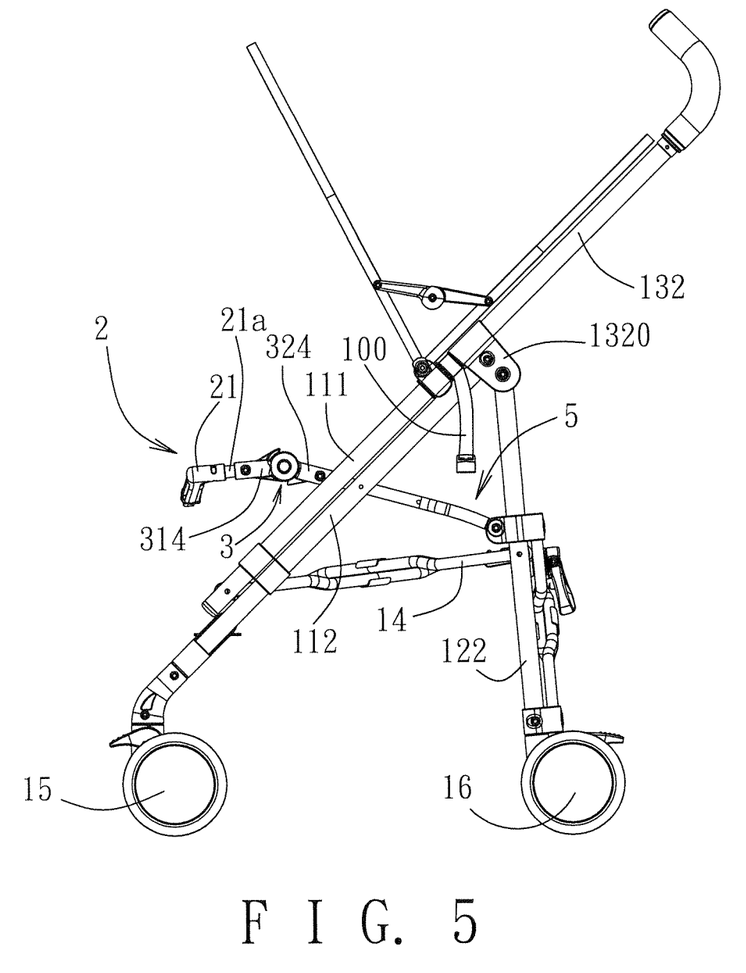
FIG. 5 is a view similar to FIG. 3 but illustrating the footrest at a second angular position.

In the first angular position, as shown in FIG. 3, the footrest 2 is erected, and is connectable with the car seat 9. In the second angular position, as shown in FIG. 5, the footrest 2 is horizontal so that, by also adjusting a backrest to a horizontal position, the stroller 1 serves as a bassinet. In the third angular position, as shown in FIG. 6, the footrest 2 is inclined and downwardly suspended such that the child occupant is supported at a sitting position, and the feet of the child occupant are placed on the footrest 2.

Figure 3A:
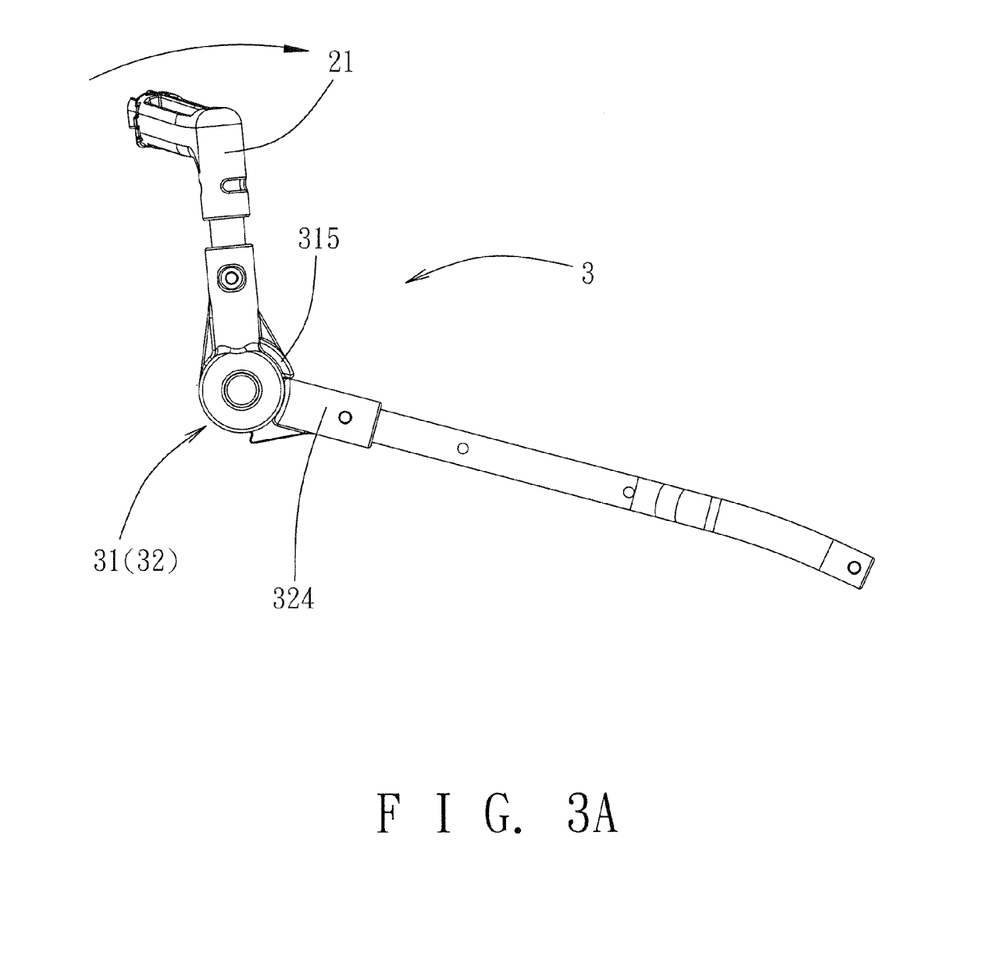
FIG. 3A is a schematic view illustrating how the footrest is maintained at the first angular position.
Figure 6A:
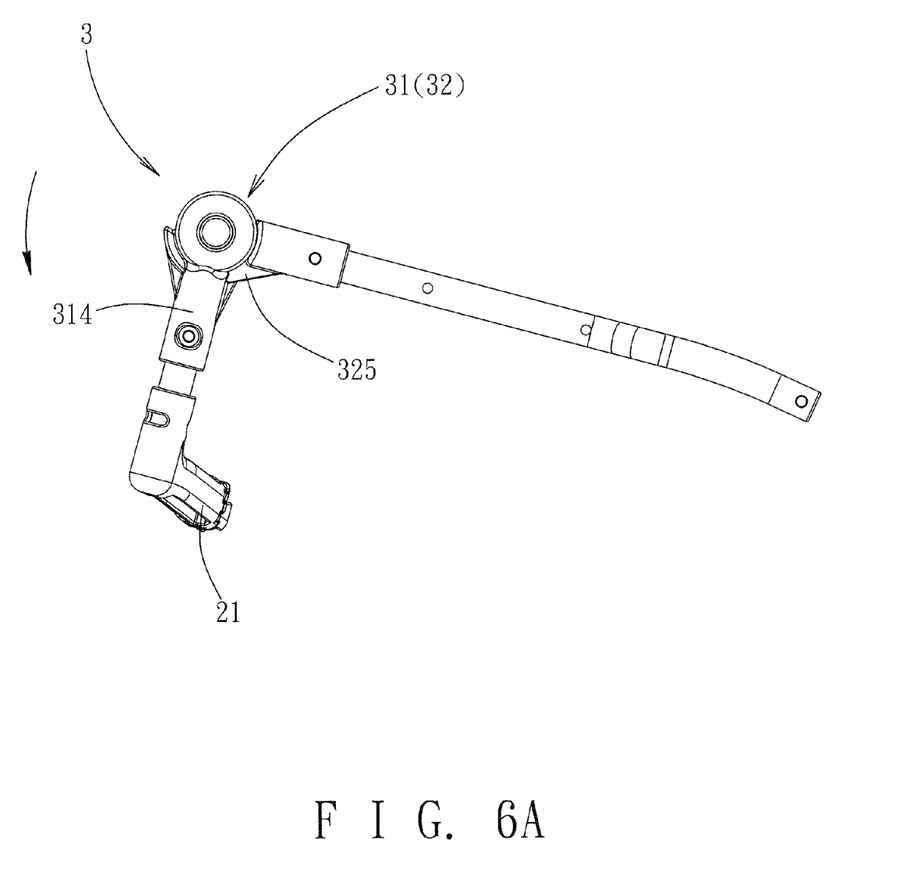
FIG. 6A is a schematic view illustrating how the footrest is maintained at the third angular position.

In this embodiment, the first and second pivot members 31, 32 are formed respectively with first and second position-limiting ribs 315, 325, each of which is configured as a plate. The first position-limiting rib 315 is connected to the first cylindrical housing 310 and the first mounting sleeve 314. The second position-limiting rib 325 is connected to the second cylindrical housing 320 and the second mounting sleeve 324. When the footrest 2 is pivoted in a first direction (B) (see FIG. 3) to the first angular position (i.e., the erected position), the first position-limiting rib 315 comes into contact with the second pivot member 32 to prevent further pivoting movement of the footrest 2 in the first direction (B), as shown in FIG. 3A. When the footrest 2 is pivoted in a second direction (C) (see FIG. 6), which is opposite to the first direction (B), to the third angular position (i.e., the downwardly suspended position), the second position-limiting rib 325 comes into contact with the first pivot member 32 to prevent further pivoting movement of the footrest 3 in the second direction (C), as shown in FIG. 6A.

With particular reference to FIG. 7, the actuator 35 has a plurality of projecting rods 351 extending through the first pivot member 31 and in contact with the positioning member 33 such that, upon operation of the actuator 35, the projecting rods 351 push the positioning member 33 away from the first pivot member 31 until the positioning member 33 is moved entirely into the second pivot member 32, thereby allowing relative rotation of the first and second pivot members 31, 32.

Again referring to FIGS. 1 and 4, when connection of the stroller 1 with the car seat 9 is desired, the actuator 35 is operated, and the footrest 2 is adjusted to the first angular position to allow for assembly of the stroller 1 and the car seat 9. In the assembly of the stroller 1 and the car seat 9, the retaining portion 921 of the car seat 9 engages the footrest 2, and the footrest 2 extends into the concaved portions 931 of the car seat 9. The seat body 91 includes a unitary housing. The unitary housing has a housing body 910, two downwardly bent curvilinear lips 911 extending respectively from two opposite sides of the housing body 910, and the retaining portion 921 disposed at a bottom portion of the housing body 910. The curvilinear lips 911 are connected respectively to the push rods 132. As such, the car seat 9 is supported stably by the stroller 1 at three supporting positions, corresponding respectively to the footrest 2 and the push rods 132. In this embodiment, the push rods 132 are provided respectively with two webbings 100 each clamped between the housing body 910 and the corresponding lip 911.

When it is desired to remove the car seat 9 from the stroller 1, the webbings 100 are first removed from the car seat 9. Next, a rear end of the car seat 9 is lifted, and the car seat 9 is separated from the footrest 2 and the push rods 132. After the car seat 9 is removed, the actuator 35 can be operated to allow the footrest 2 to be pivoted to the second or third angular positions.

Figure 11:
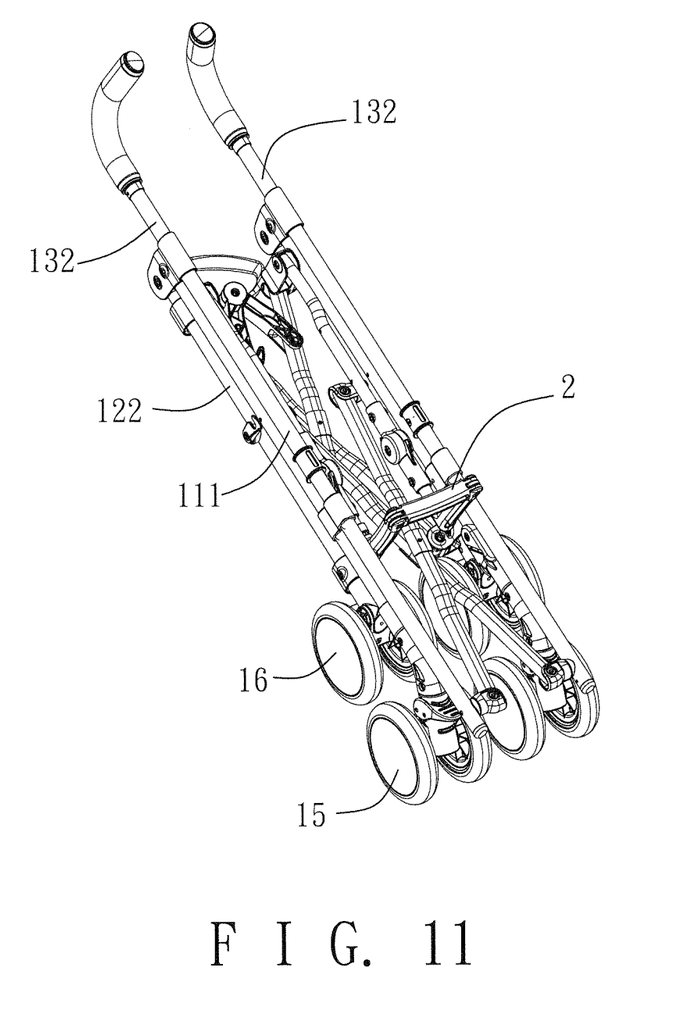
FIG. 11 is a perspective view of the preferred embodiment when it is folded.

Referring to FIGS. 10 and 11, when the stroller 1 is folded, the side rod sections 21 are pivoted inwardly relative to the middle rod sections 22 so that the longitudinal portions 21' of the side rod sections 21 are perpendicular to the middle rod section 22, thereby reducing the width of the stroller 1. To prevent outward pivoting movement of the side rod sections 21 relative to the middle rod section 22, each of the side rod sections 21 is formed with a stop block 211*a*.

In view of the above, by operating the footrest 2 and the locking devices 3, the footrest 2 can be adjusted among the first, second, and third angular positions. When the footrest 2 is disposed at the first angular position, the stroller 1 is connectable with the car seat 9 by engaging the retaining portion 921 of the car seat 9 with the footrest 2 and engaging the lips 911 with the push rods 132, thereby assembling the car seat 9 firmly to the stroller 1.

With this invention thus explained, it is apparent that numerous modifications and variations can be made without departing from the scope and spirit of this invention. It is therefore intended that this invention be limited only as indicated by the appended claims.

We claim:

1. A stroller adapted to be connected with a car seat, said stroller comprising:
    a frame having two opposite sides, each of which includes a front kg rod, a rear leg rod, and a seat rod extending between the front and rear leg rods;
    a footrest disposed between the seat rods of the sides of the frame and including two side rod sections and a middle rod section having two ends connected respectively and pivotally to said side rod sections; and
    at least one locking device disposed between one of said side rod sections and a corresponding one of the seat rods of the sides of the frame, said locking device including an angle-limiting mechanism and an actuator operable to cooperate with said angle-limiting mechanism so as to adjust said footrest among a plurality of angular positions including an erected position whereat the stroller is connectable with the car seat;
    wherein said angle-limiting mechanism includes:
    a first pivot member connected to said footrest;
    a second pivot member connected to the corresponding one of the seat rods; and
    a positioning member disposed between said first and second pivot members for locking said first and second pivot members relative to each other when said footrest is disposed at any one of the angular positions; and
    wherein said first and second pivot members are formed with first and second position-limiting ribs, respectively, and the angular positions further includes a downwardly suspended position, said first position-limiting rib coming into contact with said second pivot member when said footrest is rotated from said downwardly suspended position to said erected position in a first direction, said second position-limiting rib coming into contact with said first pivot member when said footrest is rotated from said erected position to the downwardly suspended position in a second direction opposite to the first direction, and
    wherein each of said side rod sections is L-shaped, and has a longitudinal portion pivotally connected to said middle rod section, and a transverse portion perpendicular to said longitudinal portion and pivotally connected with the corresponding one of the seat rods.

2. The stroller as claimed in claim 1, wherein said angle-limiting mechanism further includes a spring for biasing said positioning member to maintain said footrest in a locked sate, said first and second pivot members being pivotable about an axis, said angle-limiting mechanism having two axial ends opposite to each other along the axis, said actuator being disposed constantly at one of said axial ends of said angle-limiting mechanism and being operable to apply an axial force to said spring for releasing said first and second pivot members from each other.

3. The stroller as claimed in claim 1, wherein the angular positions further includes a downwardly suspended position and a horizontal position, wherein the horizontal position is located between the erected position and the downwardly suspended position.

4. The stroller as claimed in claim 1, wherein said first pivot member includes a first cylindrical housing and a first mounting sleeve extending from said first cylindrical housing, the one of said side rod sections of said footrest having an end connected to said first mounting sleeve, said second pivot member including a second cylindrical housing and a second mounting sleeve extending from said second cylindrical housing, an end of the corresponding one of said scat rods being fixed within said second mounting sleeve.

5. The stroller as claimed in claim 4, wherein said locking device further includes an engaging tube extending into said first mourning sleeve and connected to the one of said side rod sections.

6. The stroller as claimed in claim 4, wherein said first cylindrical housing is provided with a pivot shaft extending therefrom toward said second cylindrical housing, said positioning member being sleeved on said pivot shaft, said spring being disposed between said positioning member and said second cylindrical housing for biasing said positioning member into contact with said actuator, said positioning member being operable against the biasing action of said spring to push said positioning member entirely into said second cylindrical housing to thereby allow for relative rotation of said first cylindrical housing relative to said second cylindrical housing.

7. The stroller as claimed in claim 6, wherein said actuator has a plurality of projecting rods extending through said first pivot member and in contact with said positioning member such that, upon operation of said actuator, said projecting rods push said positioning member away from said first pivot member.

8. The stroller as claimed in claim 4, wherein each of said first and second pivot members includes a plurality of projections formed on a respective one of said first and second cylindrical housings and arranged circumferentially of the respective one of said first and second cylindrical housings, any two adjacent ones of said projections of said first pivot member defining a first engaging groove therebetween, any two adjacent ones of said projections of said second pivot member defining a second engaging groove therebetween, said positioning member being configured as a gear having a plurality of teeth each engaging a respective one of said first engaging grooves in said first pivot member and a respective one of said second engaging grooves in said second pivot member to lock said first and second pivot members relative to each other.

9. The stroller as claimed in claim 8, wherein each of said teeth of said positioning member has an inclined side surface facing said first pivot member such that, when said footrest is pivoted upwardly relative to said seat rods, said projections of said first pivot member come into slidable contact with said inclined side surfaces of said teeth to push said positioning member toward said second pivot member.

10. The stroller as claimed in claim 1, wherein at least one of said side rod sections is formed with a stop block for interfering with said middle rod section to prevent outward pivoting movement of said side rod sections relative to said middle rod section.

11. A car seat and stroller assembly comprising:
a stroller including
  a frame having two sides, each of which includes a front leg rod, a push rod connected to an upper end of said front leg rod, a rear leg rod, and a seat rod extending between said front and rear leg rods,
  a footrest disposed between said seat rods of said sides of said frame and including two side rod sections and a middle rod section having two ends connected respectively and pivotally to said side rod sections, and
  at least one locking device disposed between one of said side rod sections and a corresponding one of said seat rods, said locking device including an angle-limiting mechanism and an actuator operable to cooperate with said mechanism so as to adjust said footrest among a plurality of angular positions including an erected position whereat said stroller is connectable with said car seat; and
a car seat including a unitary housing, said unitary housing having a housing body, at least one downwardly bent curvilinear lip, and a retaining portion disposed at a bottom portion of said housing body, said curvilinear lip and said retaining portion being connected respectively to one of said push rods of said sides of said frame and said footrest;
wherein said angle-limiting mechanism includes:
a first pivot member connected to said footrest;
a second pivot member connected to the corresponding one of the seat rods; and
a positioning member disposed between said first and second pivot members for locking said first and second pivot members relative to each other when said footrest is disposed at any one of the angular positions; and
wherein said first and second pivot members are formed with first and second position-limiting ribs, respectively, and the angular positions further includes a downwardly suspended position, said first position-limiting rib coming into contact with said second pivot member when said footrest is rotated from said downwardly suspended position to said erected position in a first direction, said second position limiting rib coming into contact with said first pivot member when said footrest is rotated from said erected position to the downwardly suspended position in a second direction opposite to the first direction, and
wherein each of said side rod sections is L-shaped, and has a longitudinal portion pivotally connected to said middle rod section, and a transverse portion perpendicular to said longitudinal portion and pivotally connected with the corresponding one of the seat rods.

12. The car seat and stroller assembly as claimed in claim 11, wherein said car seat has two opposite sides, and two said curvilinear lips formed respectively at said sides of said car seat and retained respectively on said push rods.

13. The car seat and stroller assembly as claimed in claim 11, wherein said angle-limiting mechanism further includes a spring for biasing said positioning member to maintain said footrest in a located sate, said first and second pivot members being pivotable about an axis, said actuator being disposed at an axial end of said angle-limiting mechanism and being operable to apply an axial force to said spring for releasing said first and second pivot members from each other.

14. The car seat and stroller assembly as claimed in claim 11, wherein the angular positions farther includes a downwardly suspended position and a horizontal position, and the horizontal position is located between the erected position and the downwardly suspended position.

15. The car seat and stroller assembly as claimed in claim 11, wherein said first pivot member includes a first cylindrical housing and a first mounting sleeve extending from said first cylindrical housing, the one of said side rod sections of said footrest having an end connected to said first mounting sleeve, said second pivot member including a second cylindrical housing and a second mounting sleeve extending from said second cylindrical housing, an end of the corresponding one of said seat rods being fixed within said second mounting sleeve.

16. The ear seat and stroller assembly as claimed in claim 15, wherein said locking device further includes an engaging tube extending into said first mounting sleeve and connected to the one of said side rod sections.

17. The car seat and stroller assembly as claimed in claim 15, wherein said first cylindrical housing is provided with a pivot shaft extending therefrom toward said second cylindrical housing, said positioning member being sleeved on said pivot shaft, said spring being disposed between said positioning member and said second cylindrical housing for biasing said positioning member into contact with said actuator, said positioning member being operable against the biasing action of said spring to push said positioning member entirely into said second cylindrical housing to thereby allow for relative rotation of said first cylindrical housing relative to said second cylindrical housing.

18. The car seat and stroller assembly as claimed in claim 17, wherein said actuator has a plurality of projecting rods extending through said first pivot member and in contact with said positioning member such that, upon operation of said actuator, said projecting rods push said positioning member away from said first pivot member.

19. The car seat and stroller assembly as claimed in claim 15, wherein each of said first and second pivot members includes a plurality of projections formed on a respective one of said first and second cylindrical housings and arranged circumferentially of the respective one of said first and second cylindrical housings, any two adjacent ones of said projections defining an engaging groove therebetween, said positioning member being configured as a gear having a plurality of teeth engaging respectively said engaging grooves in each of said first and second pivot members to lock said first and second pivot members relative to each other.

20. The car seat and stroller assembly as claimed in claim 19, wherein each of said teeth of said positioning member has an inclined side surface facing said first pivot member such that, when said footrest is pivoted upwardly relative to said seat rods, said projections of said first pivot member come into slidable contact with said inclined side surfaces of said teeth of said positioning member to push said positioning member toward said second pivot member.

21. The car seat and stroller assembly as claimed in claim 11, wherein said car seat has two said curvilinear lips, and each of said push rods is provided with a webbing clamped between said housing body and a corresponding one of said curvilinear lip of said unitary housing for preventing movement of said car seat on said frame.

22. The stroller as claimed in claim 11, wherein at least one of said side rod sections is formed with a stop block for interfering with said middle rod section to prevent outward pivoting movement of said side rod sections relative to said middle rod section.

* * * * *